Aug. 13, 1968     C. M. WEYLAND ET AL     3,396,716

COOKING APPLIANCE WITH TILTING GRID

Filed May 22, 1967

INVENTORS
C.M. WEYLAND &
R.J. GETZ 3,396,716
COOKING APPLIANCE WITH TILTING GRID
Carl M. Weyland and Robert J. Getz, Quakertown, Pa., assignors to Magikitch'n Equipment Corporation and Quakertown Stove Works, Inc., both of Quakertown, Pa., both corporations of Pennsylvania
Filed May 22, 1967, Ser. No. 640,266
10 Claims. (Cl. 126—41)

ABSTRACT OF THE DISCLOSURE

A cooking appliance including a box-like structure containing a heating compartment relative to which a grid is juxtaposed and mounted for disposition in either a level position or in a tilted position.

Background of the invention

It is well known in the art of cooking appliances, especially in the cases of commercial grills and broilers, to mount the grid, on which the food is cooked, for selective positioning between a level position and a tilted position, the latter phase allowing for the draining off of excess fats and juices that would otherwise drip into the heating compartment below and start undesirable conflagrations. The level position of the grid is useful for permitting a certain amount of drainage of fats and juices into the heating compartment because a desirable effect of charcoal broiling is obtained by the co-action between such fats and the cooking burners, usually gas or electrically fired in conjunction with ceramic "coals" and the like.

The known prior art devices resort to relatively complex systems of pivots, linkages, racks and pinions, etc., all of which are expensive to manufacture, maintain and operate, and these have been the mainstay of prior cooking appliances because of the relatively great weight of the grid, which makes it difficult to manipulate without some form of mechanical advantage.

Summary of the invention

The present invention materially simplifies the construction and arrangement of the bi-positionable grid by the use of properly counter-balanced structure and a system of fulcrum and support means making it quite simple to achieve the two positions of the grid by a combination of rocking and sliding motions without the need for complicated linkages etc.

Description of a preferred embodiment

Figure 1:
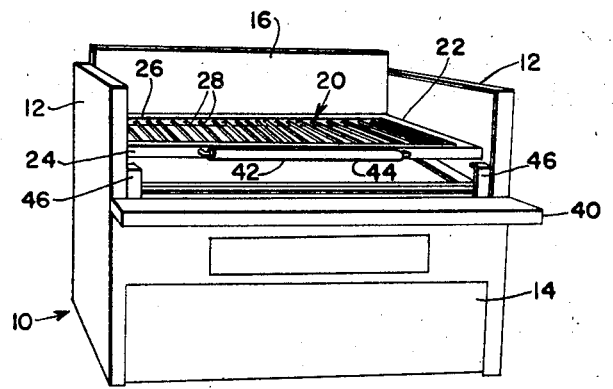
FIGURE 1 is a perspective of the cooking appliance equipped with the improved grid.

FIGURE 1 will be referred to for a general orientation of the appliance, in which respect, as well as with regard to the remainder of the description and the claims, such expression as "front," "rear," etc. are used in the interests of clarity and not by way of limitation, for it will be obvious, on the basis of what is disclosed here, that the grid may be tilted to the rear or to either side.

The appliance is essentially a box-like structure 10, constructed with opposite fore-and-aft side walls 12 and front and rear portions 14 and 16 respectively, all customarily of stainless steel or the like. Within the walls, here at a lower portion thereof, is a heating compartment or fire pot 18 within which may be contained any suitable burner system of types well known in the art, which may be either gas or electric and which may include any of the well known ceramic adjuncts, none of which are material to the present invention except with respect to the cooperation with a generally rectangular grid 20 disposed between the side walls 12 and juxtaposed relative to the compartment 18. In the present case, the grid is above the compartment; although, it is not unknown to place the heating means above a grid. The grid may be of any suitable type and is here shown as of conventional construction, including opposite side parts 22, front and rear parts 24 and 26 and a plurality of grid bars 28.

Figure 2:
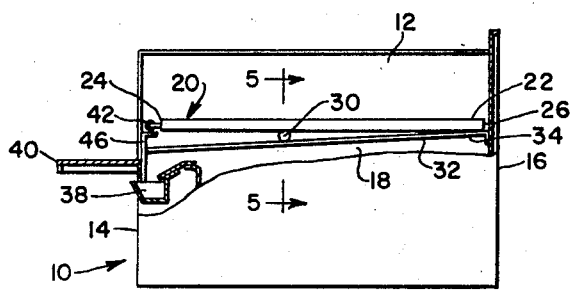
FIGURE 2 is a longitudinal section showing the grid in its level position.

The basic support of the grid between the side walls 12 comprises fulcrum and support means, the former being made up of a pair of transversely alined fulcrum elements 30, preferably of round stock and preferably of two separate coaxial parts to avoid the use of a single bar across the fire pot or heating compartment 18; although, that construction would still partake of the invention. These elements are located respectively at the side walls 12 and relatively closer to the front than to the rear of the structure 10 so that a major portion of the weight of the grid 20 is rearwardly of the fulcrum axis established by the elements 30, it being borne in mind that the grid is quite heavy because of its steel construction. From each fulcrum element 30 a ramp means 32 extends upwardly and rearwardly, beginning at the bottom of the element and inclining upwardly and rearwardly to a terminal rear end 34 that provides rear support means; and the immediate part of the rear wall portion 16 provides a stop limiting the amount of rearward insertion of the grid (FIG. 2). The ramps 32 may be upper flanges on interior walls 36 that extend downwardly to form the fire pot or compartment 18, but this is not critical.

Figure 3:
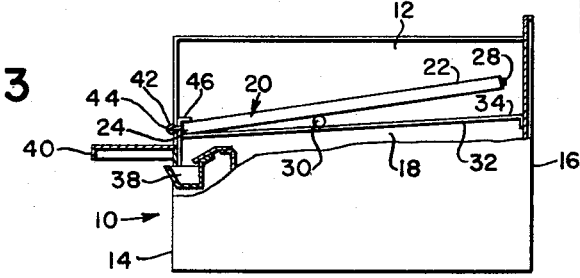
FIGURE 3 is a similar section showing the grid in its tilted position.
Figure 5:
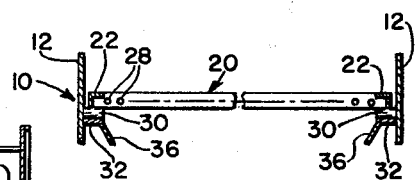
FIGURE 5 is a section on the line 5—5 of FIGURE 2.
Figure 4:
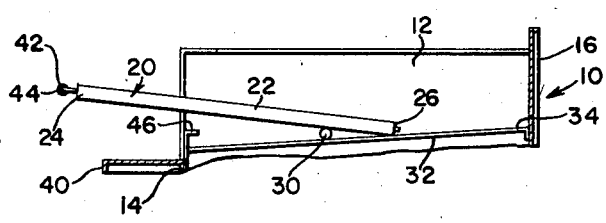
FIGURE 4 is a fragmentary section showing how the grid may be removed and replaced.

The inclination of the ramps 32 and relationship of the support ends 34 to the tops of the fulcrum elements 30 are such that the grid may occupy a first or level position (FIGURES 1 and 2). From this position, the grid may be manipulated to a second or tilted position (FIGURE 3) in which it inclines downwardly and forwardly so that fat etc. thereon may drip into a trough or pan 38 located just below a front tray or table part 40. The front part of the grid has a handle 42 by means of which the user may move the grid between the two positions of FIGURES 2 and 3 or may remove and replace the grid as shown in FIGURE 4. To further facilitate handling of the grid, the handle is in the form of a bail including an elongated cylindrical part 44 paralleling the front part of the grid, and this cylindrical part may be of relatively heavy tubing, or a bored bar of steel, adding enough weight to partly counterbalance the rearwardly overhanging weight of the grid behind the fulcra 30 so that, even though the weight bias of the grid favors the level position, it is a simple matter for the user to press down on the front of the grid, via the handle 42, and then slide the grid forwardly until the front part thereof releasably locks under locking means comprising a pair of rearwardly directed hook-like members 46 affixed to a front part of the structure 10. As seen in FIGURE 2, these locks are spaced somewhat ahead of the front of the grid and offset therebelow, and, as seen in FIGURE 1, the transverse extent of the handle 42 is such that it lies between the hooks and thus does not interfere with forward and downward motion of the grid when the grid is shifted and rocked to achieve the tilted position of FIGURE 3. When it is desired to shift the grid from the FIGURE 3 position to the FIGURE 2 position, the user merely pushes rearwardly on the grid, releasing the grid from the hooks 46 so that it, by its own weight, re-attains the FIGURE 2 position.

When it is desired to remove the grid, it may be pulled forwardly, and its rear part will slide down the ramps 32 (FIGURE 4) until the grid is far enough forwardly to enable the user to grasp it firmly at both front and rear so that he need not lean over to attempt to lift the grid directly upwardly. The reverse is true upon replacement, because after the grid is placed on the fulcra 30, it rear may ride on the ramps 32 as it is pushed rearwardly to its level position.

The arrangement is simple in nature and involves only shifting of the grid, in conjunction with the fulcra, ramps, balancing etc., all without complicated force-transmitting and motion-multiplying mechanisms.

We claim:

1. In a cooking appliance including a box-like structure having opposite fore-and-aft side walls and front and rear portions, a heating compartment within said walls and portion, and a rectangular grid disposed between the walls and in juxtaposed relation to the heating compartment, the improvement residing in means supporting the grid for tilting between two positions comprising a pair of transversely alined fulcrum elements, one at each side wall, supporting the grid both for rocking about a transverse axis and for fore-and-aft sliding movement, rear support means at the rear portion for supporting the rear of the grid in a first position, said fulcrum elements being located forwardly so that the major portion of the weight of the grid is to the rear whereby the grid in said first position rests on the fulcrum elements and the rear support means, lock means on the structure spaced forwardly and offset downwardly from the front of the grid in said first position, said grid being forcibly rockable downwardly at its front about the fulcrum elements and shiftable forwardly into releasable engagement with the lock means to support the grid in a second position inclining downwardly and forwardly relative to its first position.

2. The invention defined in claim 1, including ramp means at each side wall inclining upwardly and rearwardly from below the fulcrum elements respectively to the support means.

3. The invention defined in claim 2, in which each ramp means extends continuously from its fulcrum element to its support means.

4. The invention defined in claim 1, including a handle at the front of and for manipulating the grid between its two positions.

5. The invention defined in claim 4, in which the handle is weighted to partially counterbalance the weight of the grid rearwardly of the fulcrum elements.

6. The invention defined in claim 5, in which the handle is in the form of a bail having a portion spaced from and parallel to the front of the grid and said portion is weighted.

7. The invention defined in claim 1, including rear stop means limiting rearward movement of the grid.

8. The invention defined in claim 1 in which the grid in its first position is above the level of the lock means so as to be forwardly removable past said lock means.

9. The invention defined in claim 1, in which the lock measn includes an upper rearwardly directed hook part adapted to hook over the front of the grid in the second position of the grid.

10. The invention defined in claim 1, in which the support means and fulcrum elements are so arranged that the grid in its first position is substantially level.

References Cited

UNITED STATES PATENTS

| 2,903,549 | 9/1959 | Joseph | 126—25 X |
| 3,244,163 | 4/1966 | McGlaughlin | 126—25 |
| 3,304,929 | 2/1967 | Brunig | 126—25 |

FREDERICK L. MATTESON, JR., *Primary Examiner.*

E. G. FAVORS, *Assistant Examiner.*